US008156062B2

(12) United States Patent
Cho et al.

(10) Patent No.: US 8,156,062 B2
(45) Date of Patent: Apr. 10, 2012

(54) METHOD FOR CONSTRUCTING DATABASE TO DEDUCE DISEASE AND PROVIDING U-HEALTH SERVICE USING A SUBSET OF ONTOLOGIES

(75) Inventors: Chul-Ho Cho, Seongnam-si (KR); In-Young Ko, Daejeon (KR); Jae-Geol Cho, Yongin-si (KR); Sun-Tae Jung, Yongin-si (KR); Bum-Joon Jeon, Daejeon (KR)

(73) Assignees: Samsung Electronics Co., Ltd., Yeongtong-Gu, Suwon-Si, Gyeonggi-Do (KR); Information and Communications University, Research and Industrial Cooperation Group, Yuseong-Gu, Daejeon (KR)

( * ) Notice: Subject to any disclaimer, the term of this patent is extended or adjusted under 35 U.S.C. 154(b) by 793 days.

(21) Appl. No.: 12/233,687

(22) Filed: Sep. 19, 2008

(65) Prior Publication Data
US 2009/0083203 A1 Mar. 26, 2009

(30) Foreign Application Priority Data
Sep. 21, 2007 (KR) .................. 10-2007-0096806

(51) Int. Cl.
*G06F 17/00* (2006.01)

(52) U.S. Cl. .......................................... 706/45
(58) Field of Classification Search ............ 706/12, 706/45
See application file for complete search history.

(56) References Cited

U.S. PATENT DOCUMENTS

| 7,725,328 B1* | 5/2010 | Sumner et al. ............. 705/2 |
| 2002/0183988 A1* | 12/2002 | Skaanning et al. ......... 703/2 |
| 2007/0050215 A1* | 3/2007 | Kil et al. .................. 705/3 |
| 2007/0167855 A1* | 7/2007 | Shin et al. ............... 600/533 |
| 2008/0201280 A1* | 8/2008 | Martin et al. ............ 706/12 |
| 2010/0049676 A1* | 2/2010 | Devitt et al. ............ 706/12 |

* cited by examiner

Primary Examiner — David Vincent
(74) Attorney, Agent, or Firm — Cha & Reiter, LLC

(57) ABSTRACT

A method for constructing a database to deduce a disease and constructing a Bayesian network for U-Health application, the method including the steps of analyzing U-Health information, which includes a disease, a symptom, and a treatment, and constructing a plurality of U-Health ontologies required for service provision, setting a meta-model defining cause-and-effect relationships between the constructed U-Health ontologies and selecting at least two specific U-Health ontologies from among the plurality of U-Health ontologies, setting the selected U-Health ontologies as nodes, and generating a Bayesian network by applying the meta-model to the set nodes.

24 Claims, 9 Drawing Sheets

METHOD FOR CONSTRUCTING DATABASE TO DEDUCE DISEASE AND PROVIDING U-HEALTH SERVICE USING A SUBSET OF ONTOLOGIES

CLAIM OF PRIORITY

This application claims the benefit of the earlier filing date, pursuant to 35 USC 119, to that patent application entitled "Method For Constructing Database To Deduce Disease And Providing U-Health Service" filed with the Korean Intellectual Property Office on Sep. 21, 2007 and assigned Serial No. 2007-96806, the contents of which are incorporated herein by reference.

BACKGROUND OF THE INVENTION

1. Field of the Invention

The present invention relates to a method for providing U-Health service by using a specialized database, and more particularly to a method for providing U-Health service by using a database based on semantics and probabilistic inference.

2. Description of the Related Art

The Bayesian network (BN) is one of known methods for probabilistic information representation and inference, that have been widely used for diagnosis of diseases and other aliments in the Bio-information field. Through the use of the Bayesian network, it is possible to represent probabilistic information required for constructing a U-Health service. However, in order to construct a Bayesian network for diagnosing a specific disease, a specialist in a corresponding field must collect and analyze related information one by one, personally construct numerous Bayesian network nodes according to information elements related to the specific disease, and establish links between the information elements. Therefore, constructing such a Bayesian network requires a great deal of labor.

Meanwhile, recently, in order to overcome a limitation in a conventional text-based information representation methods, methods of managing various data based on ontologies have been widely researched and used. However, the existing ontologies represent fixed relationships between text-based information elements. That is, the existing ontologies are represented only with "having a connection" or "having no connection."

When such text-based ontologies are applied to the Bayesian network as they are, concepts having no particular linguistic similarity to each other, for example, obesity and hypertension, are determined to have little connection with each other. However, since obesity exerts a great effect on hypertension induction, it may be inferred that the two concepts are closely connected with each other so that reliable U-Health service can be provided. Therefore, in order to construct a Bayesian network to provide reliable U-Health service, a method for reliably inferring a relationship between diseases is required.

Also, most conventional methods are implemented in such a manner as to simply convert all ontology classes to Bayesian network nodes. When a Bayesian network is created based on ontologies in which a great amount of information has been accumulated, the created Bayesian network becomes huge in scale, and becomes overly complicated. Especially, when ontology classes are applied to a Bayesian network in order to provide U-Health service, and a disease is deduced by using the Bayesian network, too many operations and a long time are required to analyze data. Therefore, it is necessary to develop a method for constructing a Bayesian network by extracting only ontologies relating to a specific disease, and providing U-Health service by using the Bayesian network.

SUMMARY OF THE INVENTION

Accordingly, the present invention provides a method for automatically constructing a Bayesian network suitable for the deduction of disease through use of semantic information represented based on ontologies.

In addition, the present invention provides a method for reliably and rapidly providing U-Health service by using the Bayesian network constructed suitable for the deduction of disease.

In accordance with an aspect of the present invention, there is provided a method for constructing a database to deduce a disease and constructing a Bayesian network for U-Health application, the method including the steps of analyzing U-Health information, which includes a disease, a symptom, and a treatment, and constructing a plurality of U-Health ontologies required for service provision, setting a meta-model for cause-and-effect relationships between the constructed U-Health ontologies; and selecting at least two specific U-Health ontologies from among the plurality of U-Health ontologies, setting the selected U-Health ontologies as nodes, and generating a Bayesian network by applying the meta-model to the set nodes.

The step of analyzing may include the steps of: setting common ontologies which includes various kinds of ontologies required for disease deduction; and setting an intermediate ontology, which includes at least one specific ontology relating to a specific disease, from among the common ontologies.

The U-Health ontology may include a disease ontology in which information on kinds of disease is defined, a symptom ontology in which information on symptoms caused by diseases is defined, an environment ontology in which information on environments of a person targeted for disease deduction is defined, and a treatment ontology in which treatment methods for diseases are defined.

The U-Health ontology may further include a user information ontology, in which user information received from a user, including age, sex, family disease history, and biological signals, is defined. Also, the U-Health ontology may further include a sensor ontology, in which sensor information, including kinds of sensors used for measuring biological signals of a user, and information on values measured by the sensors, is defined.

In addition, the U-Health ontology corresponds to an ontology input from a user through an interface which enables the user to edit the ontology.

Preferably, the intermediate ontology may be constructed by receiving personal information, which includes age, sex, family disease history, and symptoms, from an exterior, extracting specific classes corresponding to the personal information from among a plurality of classes included in the ontology, and combining the extracted classes.

The meta-model may be a model in which cause-and-effect relationships between a plurality of ontologies are defined.

The step of selecting at least two specific U-Health ontologies may include the steps of: providing a user terminal with a hierarchical structure of the plurality of ontologies, and setting an abstraction level by receiving a selection of a level of a specific layer which relates to the U-Health service to be provided to a user, setting an ontology included in at least one selected layer as a node of the Bayesian network by taking the set abstraction level into consideration and connecting nodes of the Bayesian network with each other by taking the meta-model into consideration.

Preferably, in the step of setting the abstraction level, a layer and a highest layer level, in which an ontology of a disease having no connection with a specific disease among the plurality of ontologies is included, may be restricted from being selected.

The nodes of the Bayesian network may include a main Bayesian network node constituted by an ontology which is included in a selected abstraction level's layer, and a sub-Bayesian network node constituted by an ontology which is included in a lower layer of the main Bayesian network node.

In accordance with another aspect of the present invention, there is provided a method for providing a U-Health service by using a Bayesian network, the method including the steps of: analyzing U-Health information, which includes a disease, a symptom, and a treatment, and constructing a plurality of U-Health ontologies required for service provision; setting a meta-model for cause-and-effect relationships between the constructed U-Health ontologies, selecting at least two specific U-Health ontologies from among the plurality of U-Health ontologies, setting the selected U-Health ontologies as nodes, and generating a Bayesian network by applying the meta-model to the set nodes; and receiving personal information, which includes age, sex, family disease history, and symptoms, from a user, substituting the personal information into a database constructed based on the Bayesian network, and probabilistically inferring a disease of a user.

In accordance with still another aspect of the present invention, there is provided a system for providing a U-Health service, the system including: a user terminal and a server connected with the user terminal through a communication network, wherein the server includes an ontology management unit for providing an interface to receive an ontology from the user terminal, and storing a plurality of ontologies received from a plurality of users in a database, a meta-model management unit for providing an interface to receive a meta-model of cause-and-effect relationships between ontologies from the user terminal, and storing the received meta-model in a database, an abstraction level setting unit for providing the user terminal with a hierarchical structure of a plurality of ontologies, receiving a selection of a level of a specific layer relating to a U-Health service to be provided to a user, and setting an abstraction level, a Bayesian-network node generation unit for setting an ontology included in at least one selected layer as a node of a Bayesian network by taking the set abstraction level into consideration; a Bayesian-network link generation unit for connecting nodes of the Bayesian network with each other by taking the meta-model into consideration, a U-Healthcare management unit for receiving personal information, which includes a user's age, sex, family disease history, and symptoms, from the user terminal, substituting the personal information into a database constructed based on the Bayesian network, and inferring a disease of a user and a result of a diagnosis; and a web page management unit for providing an input/output interface with the user terminal through a web page, and providing the user terminal with a result of the inference by the U-Healthcare management unit.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

Figure 1:
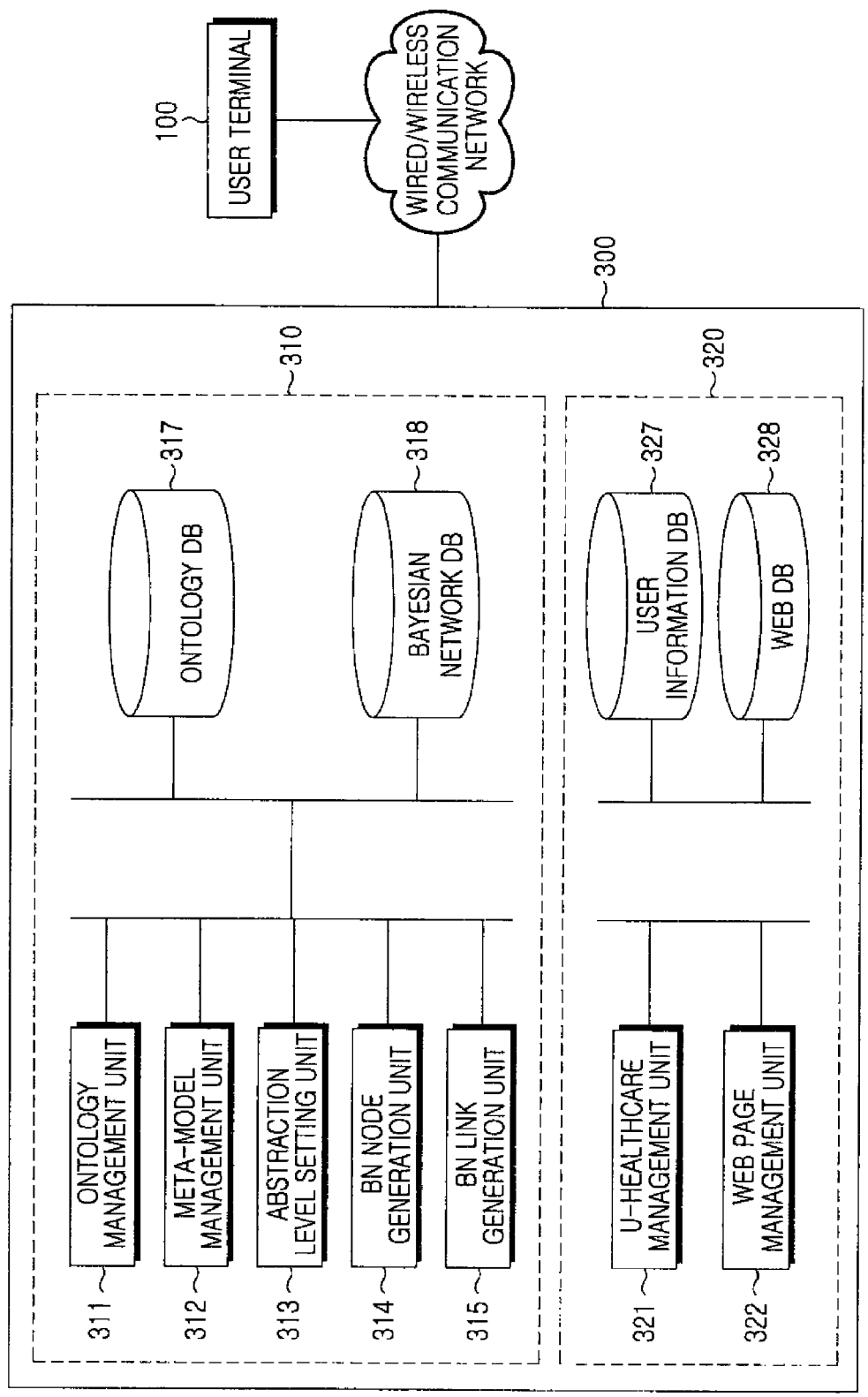
FIG. 1 is a block diagram schematically illustrating the configuration of a U-Health service provision system using a Bayesian network according to an exemplary embodiment of the present invention.

FIG. 1 is a block diagram schematically illustrating the configuration of a U-Health service provision system using a Bayesian network according to an exemplary embodiment of the present invention. The U-Health service provision system using a Bayesian network includes a user terminal 100 and a U-Health service provision server 300, which are connected through a wired/wireless communication network.

The user accesses the U-Health service provision server 300 through use of the user terminal 100, and can construct a database for service provision by modifying information stored in the U-Health service provision server 300. In addition, through use of the user terminal 100, the user can transmit personal information, including his/her age, sex, family disease history, symptoms, etc., to the U-Health service provision server 300, request the U-Health service provision server 300 to infer his/her disease, and be provided with a result of the inference.

Therefore, the user terminal 100 has only to be a device capable of performing a user interface function for data, which the U-Health service provision server 300 provides for construction of a database through a communication network. For example, the user terminal 100 may be a personal computer, a laptop computer, a PDA, or a mobile terminal.

The U-Health service provision server 300 constructs a database specialized for service provision, and provides U-Health service based on the constructed database. The database may be constructed based on information input by a user who has specialized knowledge. To this end, the U-Health service provision server 300 includes an apparatus (hereinafter, referred to as a "Bayesian network generation section") 310 capable of receiving data from the user. The Bayesian network generation section 310 includes an ontology management unit 311, a meta-model management unit 312, an abstraction level setting unit 313, a Bayesian network (BN) node generation unit 314, a BN link generation unit 315, and databases containing an ontology DB 317 and a Bayesian network DB 318.

The ontology management unit 311 analyzes information (e.g. a disease, a symptom, user information, etc.) required for U-Health service provision, designs the kind, structure, model, etc. of ontology, required for service construction, and constructs a detailed ontology through utilization of pre-constructed bio-information ontology or through analysis by a specialist based on the design. The ontology management unit 311 may access an external database, which has stored bio-information ontologies, and receive an ontology required for service construction. Also, the ontology management unit 311 may receive an ontology separately generated by a user who has specialized knowledge. To this end, the ontology management unit 311 provides the user terminal 100 with an editing tool, which is programmed to enable the user to edit an ontology, and either generates and stores an ontology in the ontology DB (data base) 317, or modifies ontologies stored in the ontology DB 317 according to an input from the user terminal 100.

Figure 2:
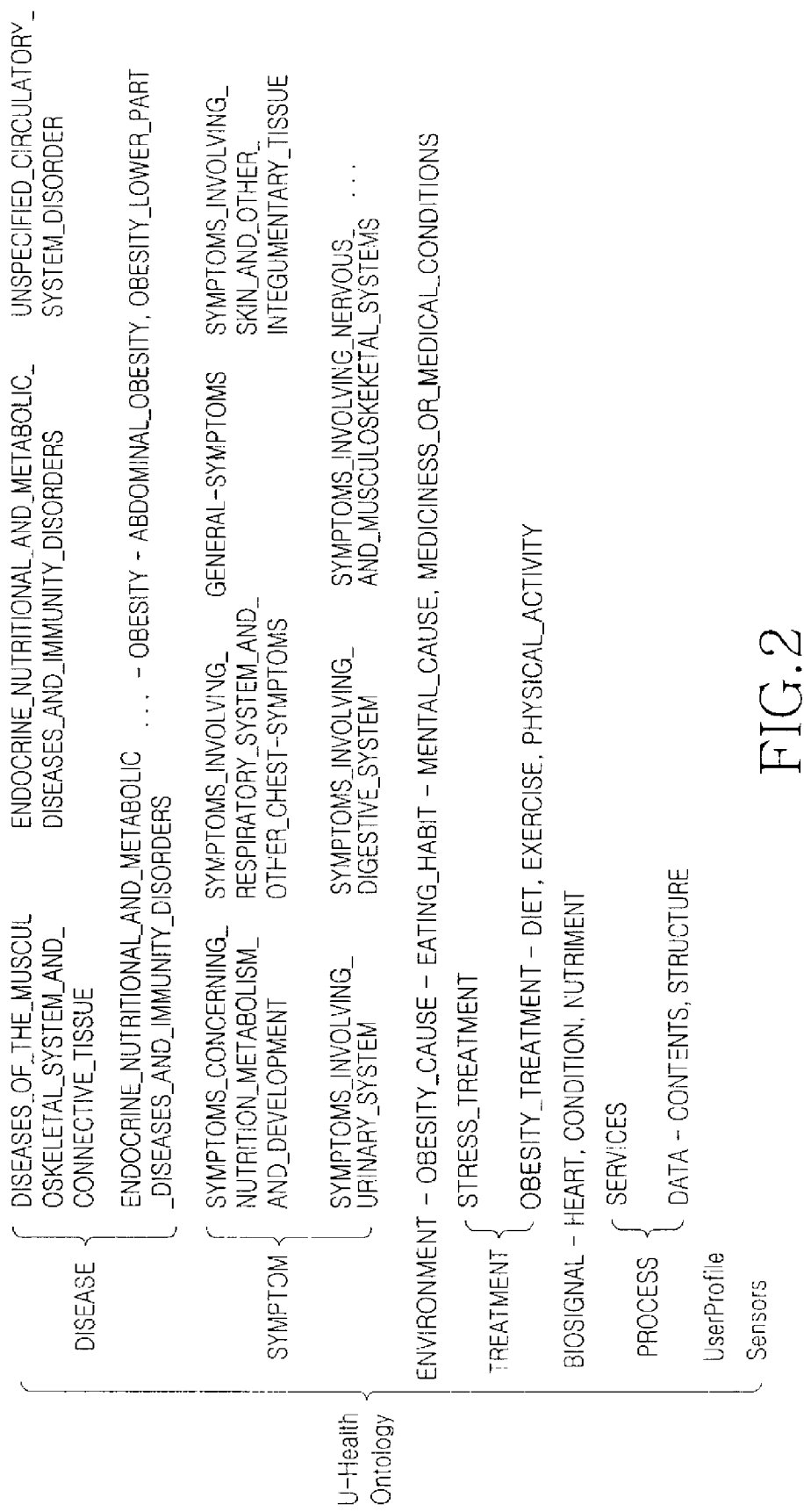
FIG. 2 is a view illustrating a U-Health ontology constructed by a U-Health service provision system using a Bayesian network according to an exemplary embodiment of the present invention.

For example, the ontologies stored in the ontology DB 317 may have a structure as shown in FIG. 2. That is, the ontology DB 317 may store ontologies, including a DISEASE ontology for specifying the kinds of diseases of typical users, a SYMPTOM ontology for specifying typical users' symptoms caused according to diseases, an ENVIRONMENT ontology for identifying the causes of diseases, a TREATMENT ontology for specifying medical treatment methods for diseases, a BIO-SIGNAL ontology for classifying bio-data, a PROCESS ontology for specifying the functional aspects of service, a USER PROFILE ontology for expressing personal information of users, and a sensor ontology for specifying information abut sensors utilized for U-Health service.

In addition, the ontology DB 317 has stored various ontologies that have no connection with a specific disease. Accordingly, since a Bayesian network constructed in connection with a specific disease includes a plurality of unnecessary ontologies, the structure of the Bayesian network may be complicated, so that there is a problem in that many operations and a long time may be required for disease deduction. Therefore, in order to reduce the complexity in constructing a Bayesian network using an ontology, and to ensure consistency between the ontology and the Bayesian network, it is preferred to construct an intermediate ontology.

In order to construct an intermediate ontology applied to infer a specific disease, it is necessary to first identify principal causes inducing the specific disease. For example, a body mass index (BMI) and the amount of surplus calories are important information in deciding obesity. Based on information collected for applications, as described above, an intermediate ontology specialized for a specific application is constructed.

Such an intermediate ontology may be constructed by using user information, bio-data, and history-taking information, which are input in a procedure of executing U-Health service. Accordingly, the ontology management unit 311 receives data in a procedure of progressing U-Health service, and constructs an intermediate ontology by using the received data.

An intermediate ontology includes a plurality of classes, and each class includes a value representing a relationship between the corresponding class and the U-Health ontology as a rule. Such rules may be expressed by first-order logic.

Figure 3:
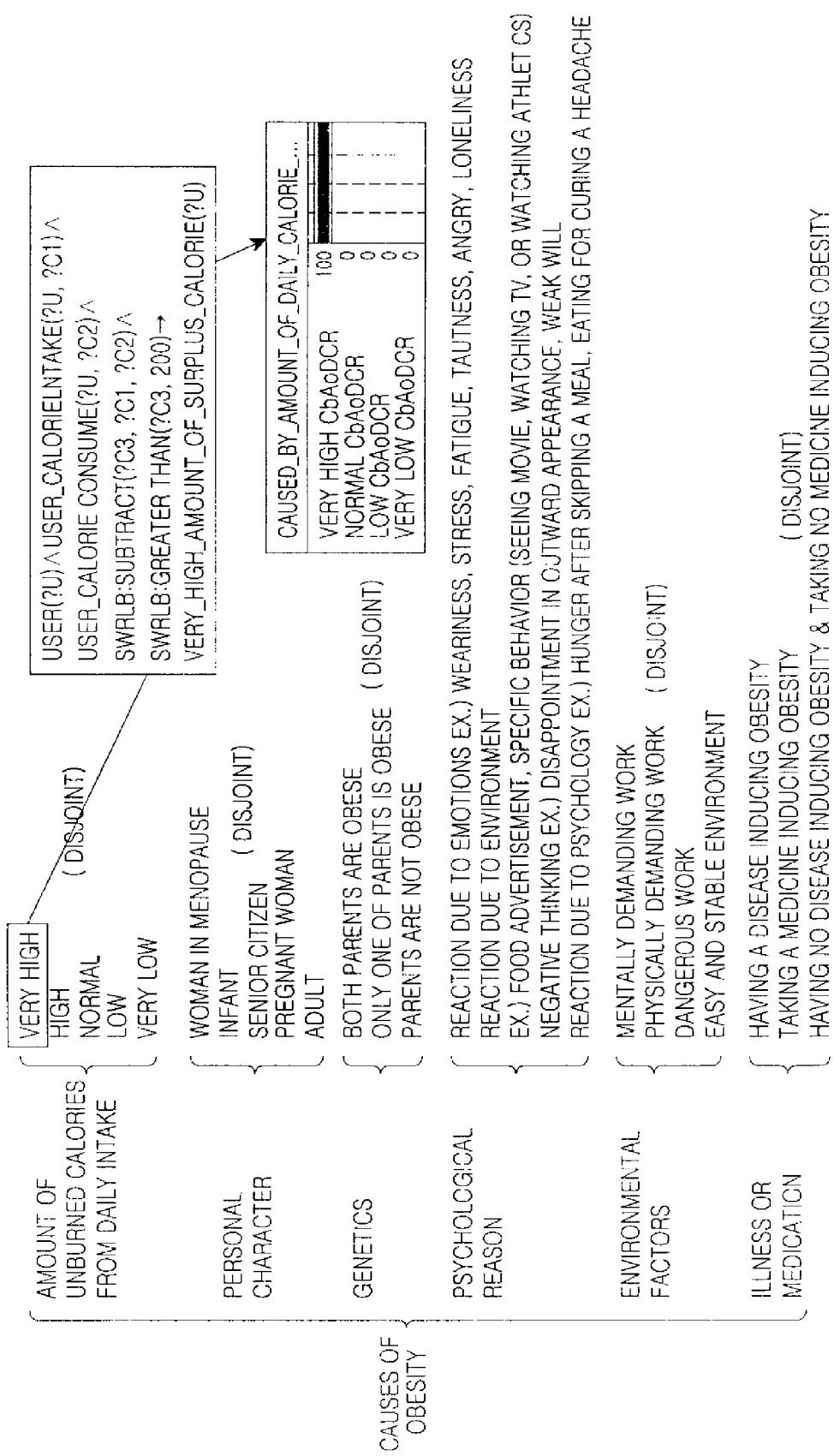
FIG. 3 is a view illustrating a specific disease-related intermediate ontology constructed by a U-Health service provision system using a Bayesian network according to an exemplary embodiment of the present invention.
Figure 4:
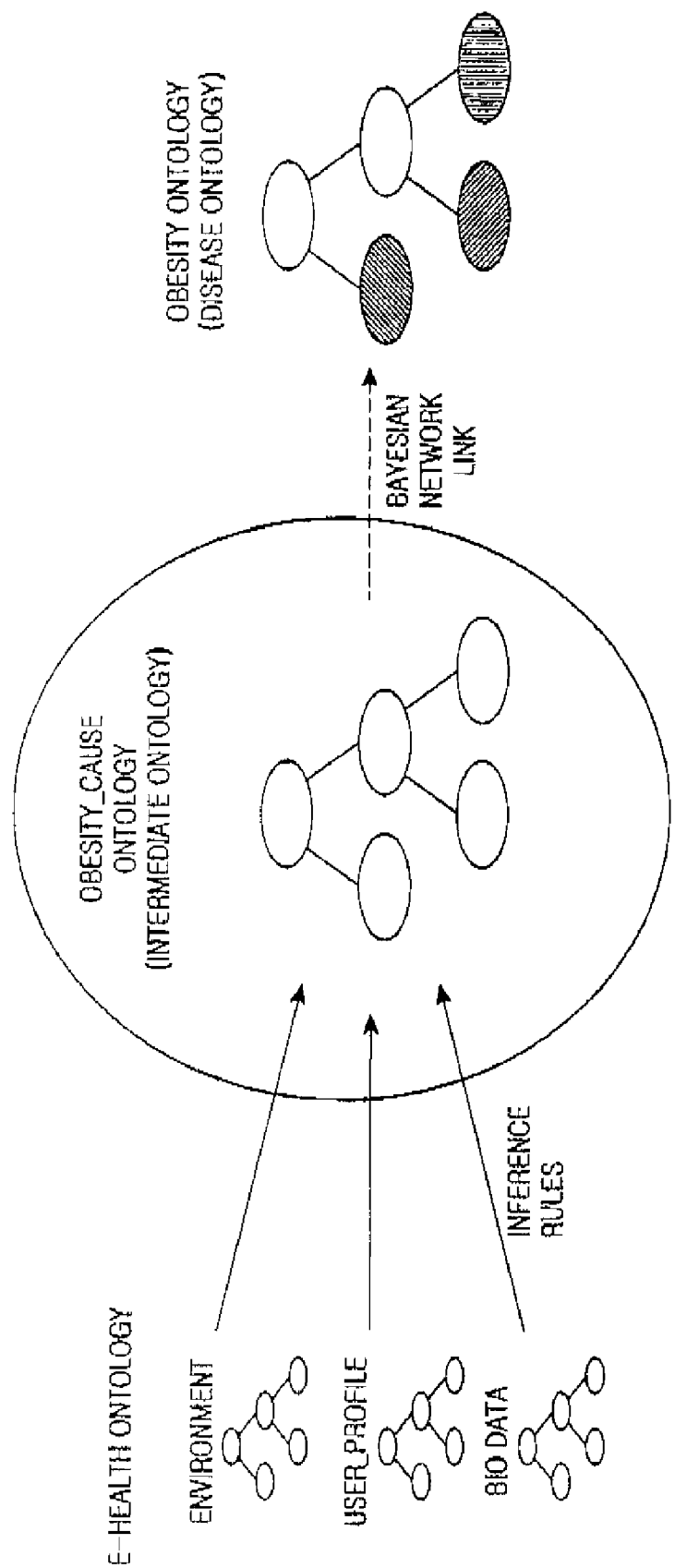
FIG. 4 is a view illustrating a relationship between a U-Health ontology and an intermediate ontology, which are constructed by a U-Health service provision system using a Bayesian network, according to an exemplary embodiment of the present invention.

FIG. 3 is a view illustrating an intermediate ontology specialized and constructed for a U-Health service provision system using a Bayesian network according to an exemplary embodiment of the present invention, and FIG. 4 is a view illustrating a relationship between a U-Health ontology and an intermediate ontology, which are constructed in a U-Health service provision system using a Bayesian network, according to an exemplary embodiment of the present invention.

FIG. 3 illustrates an ontology of the causes of obesity, including ontologies such as AMOUNT OF UNBURNED CALORIES, PERSONAL CHARACTER, GENETICS, PHYCHOLOGICAL REASON, ENVIRONMENTAL FACTORS AND ILLNESS or MEDICATION and particularly illustrates rules of classes included in an item of "AMOUNT OF SURPLUS (or unburned) CALORIES." In detail, FIG. 3 illustrates a case where the rules of the classes are expressed by using a Semantic Web mark-up Rule Language (SWRL). The rules are defined for classes relating to the amount of surplus or unburned calories on the intermediate ontology, and are used to identify the amount of surplus or unburned calories by comparing the caloric intake of a user with the caloric expenditure of the user. When user information, bio-data, and history-taking information are given while a U-Health service is actually being provided, a rule of an intermediate ontology connected with the provided information is executed. For example, when the caloric intake and the caloric expenditure are given, and the amount of surplus calories is determined to be high, a class of "VERY HIGH" is selected on the intermediate ontology. The rule calculates the amount of daily remaining calories by using the caloric intake and the caloric expenditure, and infers information, such as "high" or "low" with respect to the amount of surplus or unburned calories, like "Very_High_Amount_of_Surplus_ Calorie." Also, an effect of the rule is matched to a state of a node, which is generated as a class of "VERY HIGH," in a Bayesian network, is utilized as an evidence of a situation represented by the corresponding node, and is utilized for inference by the Bayesian network. That is, the node state of "VERY HIGH" is determined to be "Very_High_A- mount_of_Surplus_Calorie" through evidence found through the rule in advance, is expressed as 100% (which represents that this situation corresponds to the corresponding state), and exerts an influence on other Bayesian network nodes.

Meanwhile, although a Bayesian network has been constructed, it is difficult to identify the correlation and dependency between ontologies constructed as nodes, and to connect the ontologies. Especially, as a targeted application is more complicated, the number of nodes included in a Bayesian network increases, so that it is more difficult to analyze relationships between nodes one by one and to establish links between the nodes. Although the ontologies are generally utilized to represent linguistic relationship between words, it is necessary for ontologies to define cause-and-effect relationships between nodes in order to diagnose a disease in the U-Health service.

Figure 5:
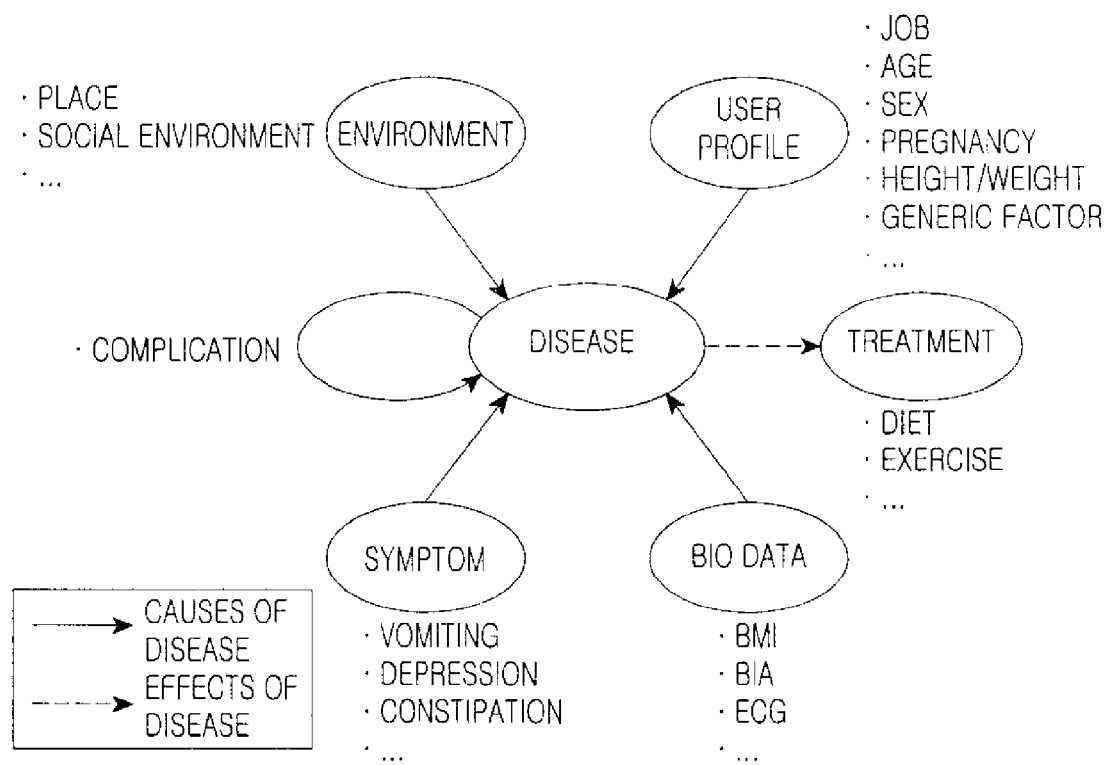
FIG. 5 is a view illustrating a general cause-and-effect relationship in diagnosing a disease.

FIG. 5 is a view illustrating a general cause-and-effect relationship in diagnosing a disease. Generally, elements related in diagnosing a disease include the causes of the disease and the effects of the disease. In FIG. 5, elements connected with solid-line arrows, which are directed to "Disease," represent causes inducing the disease, and an element connected to a dotted-line arrow, which is directed from the "Disease" to the exterior, represents an effect generated by the disease. Causes inducing a disease include environmental factors, personal character, and other diseases inducing the corresponding disease, and effects of a disease include symptoms, complications, user's biological signals (Bio-data), measured by sensors, and treatments according to diseases.

Therefore, the U-Health service provision server according to an exemplary embodiment of the present invention generates a meta-model, which represents correlations, (cause-and-effect relations), between ontologies constructed as nodes in a specific field. A meta-model is generated by the meta-model management unit 312. That is, the meta-model management unit 312 provides an environment through which the user terminal 100 can input a meta-model. For example, the environment, through which a meta-model can be input, may be a user interface, a web page, etc., which are implemented in such a manner as to present the user terminal 100 with various elements related to a disease, and to establish cause-and-effect relationships between the elements.

Figure 6:
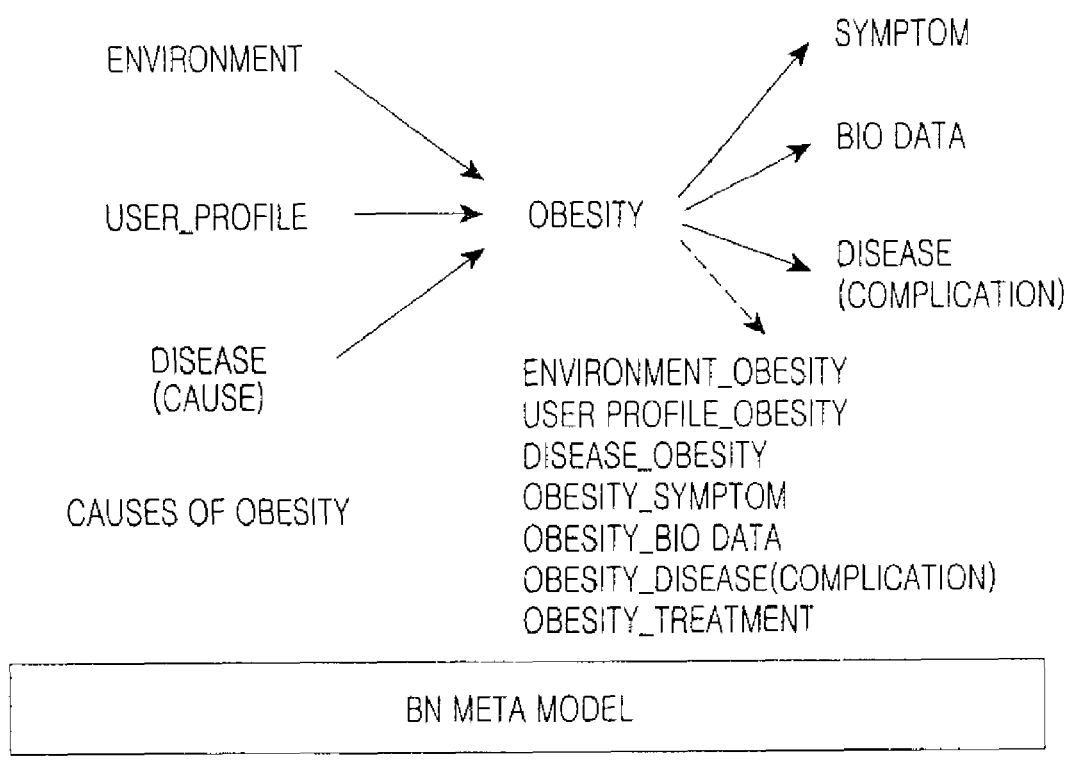
FIG. 6 is a view illustrating a meta-model constructed by a U-Health service provision system using a Bayesian network according to an exemplary embodiment of the present invention.

FIG. 6 is a view illustrating a meta-model established through the U-Health service provision server according to an exemplary embodiment of the present invention. FIG. 6 is a conceptual view illustrating a meta-model which is specialized and established for obesity management. The meta-model may be expressed in such a manner as to flexibly change relationships between nodes depending on targets thereof. Such a meta-model enables the user to take into consideration the relationships between only nodes which are meaningful in deducing a specific disease, instead of taking the combinations between all nodes into consideration, upon generating links in a Bayesian network. Therefore, the meta-model enables links between nodes to be easily generated. Also, such a meta-model is a relational model specialized for an application, and enables Bayesian networks for diagnosis of various diseases to be constructed from an equal U-Health ontology.

Generally, a U-Health ontology includes a plurality of classes, which are hierarchically structured. If a plurality of ontology classes is all switched to network nodes upon generating a Bayesian network, not only the configuration of nodes in the Bayesian network is complicated, but also concepts having similar meanings may be overlapped. Therefore, when a U-Health service to diagnose a specific disease is provided, it is preferred to extract and use only partial ontology classes relating to the specific disease, instead of using the entire U-Health ontology.

To this end, the U-Health service provision server according to an exemplary embodiment of the present invention includes the abstraction level setting unit 313 (FIG. 1) for selecting an abstraction level on an ontology For reference, it is assumed that a plurality of ontologies is hierarchically stored in the ontology DB 317 (FIG. 1). The abstraction level setting unit 313 displays the hierarchical structure of ontologies on the user terminal 100. Also, the abstraction level setting unit 313 requests the user terminal 100 to select an abstraction level from the hierarchical structure of ontologies, and receives a selection of a specific level from the user terminal 100 (FIG. 1).

The user may select different abstraction levels according to types or kinds (disease, symptom, Bio-data, etc.) of ontology classes, which represent information required for construction of an application, in one ontology, and the selected classes are transferred to the BN node generation unit 314 (FIG. 1).

The BN node generation unit 314 automatically generates nodes of a Bayesian network by using abstraction levels, which has been set by the abstraction level setting unit 313. In a Bayesian network, a state represents a situation which a node may have. For example, when there is a node called "Personal Character," the node may have one state called a "Pregnant Woman," an "Old Man," etc. According to an exemplary embodiment of the present invention, pieces of state information of each node are set to have a discrete distribution, and to have mutual disjointed relationships. For example, when a "Personal Character" node is in the state of the "Pregnant Woman," the "Personal Character" node cannot also have the state of the "Old Man." In consideration of such disjointed relationships, the BN node generation unit 314 automatically generates nodes of a Bayesian network, and stores the generated Bayesian network nodes in the Bayesian network DB 318 (FIG. 1). Table 1 below illustrates an algorithm for automatically generating nodes of a Bayesian network by the BN node generation unit 314.

TABLE 1 for each class, c, in ontology do
   if c is selected as an abstraction level then
      if c doesn't have any subclasses then
         Make a node of c for the main BN, M, with true/false states;
      else
         if all subclasses of c are disjoint with each other then
            Make a node of c for M with subclasses of c as states;
         end
         else
            Make a node of c for M with true/false states;
            foreach subclass, s, of c do
               if all subclasses of s are disjoint then
                  For a sub BN of c, make a node of s with subclasses of
                    s as states;
               end
               else
                  For a sub BN of c, make a node of s with true/false states;
               end
            end
         end
end
end When an ontology class does not have any subclass, the BN node generation unit 314 generates a Bayesian network node which has the title of the corresponding ontology class and True and False states. A Bayesian network node probabilistically represents whether a situation represented by an ontology class, which has been shifted into the corresponding Bayesian network node, exists. In addition, a Bayesian network includes a main Bayesian network and a sub-Bayesian network. The main Bayesian network accommodates nodes that are generated using only ontology classes within a selected abstraction level range. The sub-Bayesian network accommodates nodes that are generated using subclasses of a class selected by an abstraction level. A node included in the main Bayesian network may have one sub-Bayesian network corresponding to the node. In contrast, a sub-Bayesian network provides information included in a layer lower than a node included in the main Bayesian network. When an ontology class has subclasses, the BN node generation unit 314 generates a sub-Bayesian network. However, if the subclasses are expressed as having mutual disjointed relationships, and do not include parts which intersect in meaning, the BN node generation unit 314 does not generate a sub-Bayesian network. As a substitute, in this case, the BN node generation unit 314 adds the subclasses as states of nodes which are generated as a higher class.

When the user requests more detailed information on a node of the main Bayesian network, the BN node generation unit 314 forms a Bayesian network by activating a sub-Bayesian network corresponding to the node. Each sub-Bayesian network is managed independently of a main-Bayesian network so that the complexity of a constructed Bayesian network can be lowered, and that more detailed information on each sub-Bayesian network can be considered if necessary, which enables a disease to be more accurately diagnosed.

Figure 7:
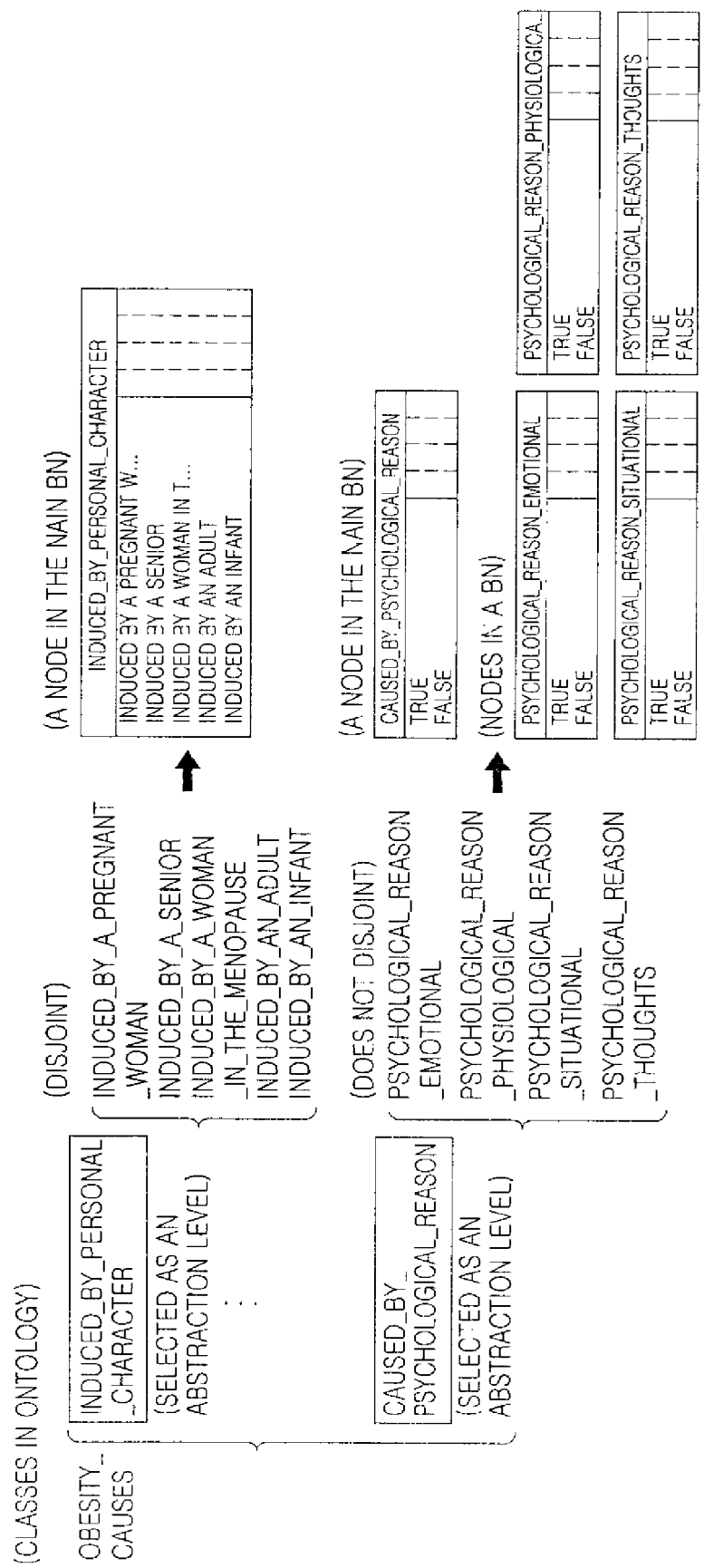
FIG. 7 is a view illustrating a Bayesian network node generated by a U-Health service provision system using a Bayesian network according to an exemplary embodiment of the present invention.

FIG. 7 is a view illustrating a Bayesian network node generated by the BN node generation unit 314 according to an exemplary embodiment of the present invention. When an ontology (e.g. "INDUCED_BY_PERSONAL_CHARACTER") selected through the abstraction level setting unit 313 is expressed in a disjointed relationship, and does not include parts that intersect in meaning, the BN node generation unit 314 does not generate a sub-Bayesian network, and generates nodes of only a main Bayesian network. In contrast, when an ontology (e.g. "CAUSED_BY_PSYCHOLOGICAL_REASON") selected through the abstraction level setting unit 313 is expressed in a disjointed relationship, and includes parts which intersect in meaning, the BN node generation unit 314 nodes of a sub-Bayesian network, as well as nodes of a main Bayesian network.

Figure 8:
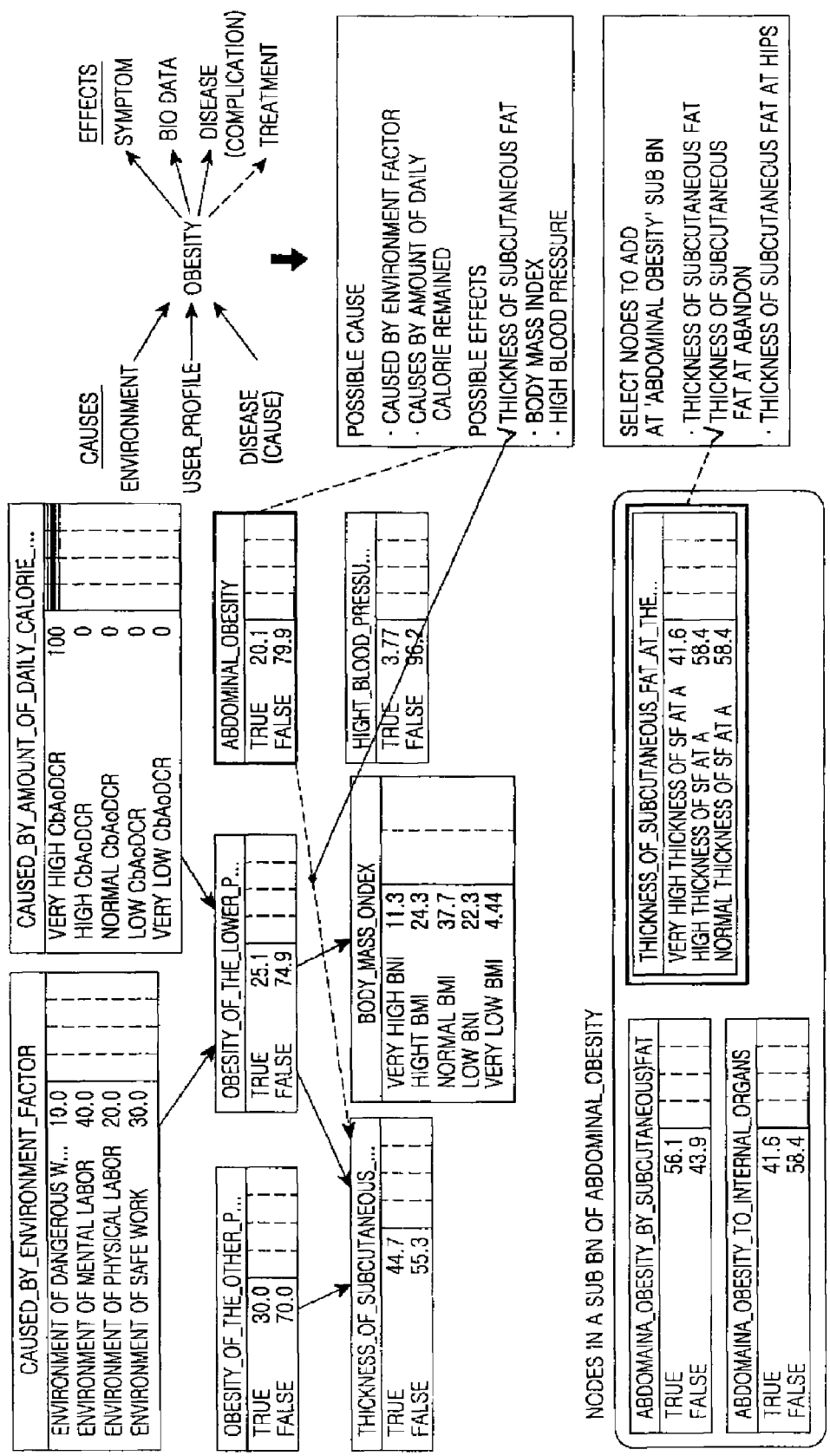
FIG. 8 is a view illustrating a Bayesian network link generated by a U-Health service provision system using a Bayesian network according to an exemplary embodiment of the present invention.

The BN link generation unit 315 (FIG. 1) generates Bayesian network links to connect the nodes of a Bayesian network which has been generated through the BN node generation unit 314, based on a meta-model formed through the meta-model management unit. The BN link generation unit 315 may generate Bayesian network links, as shown in FIG. 8, based on an algorithm described in Table 2 below.

TABLE 2

```
A user, U, requests a linking for a specific node, n, in a BN model
    Cause nodes list of n, C := empty;
    Effect nodes list of n, E := empty ;
    foreach node, o, in the same level of BN with n do
        if o has a Cause relation with n at the meta model then
            Add o at C;
        end
        if o has a Effect relation with n at the meta model then
            Add o at E;
        end
    end
    foreach nodes, o' in C and E do
        Ask U whether add link between o' and n;
        if U answer yes then
            mark o' to be link node with n;
        end
    end
    foreach marked nodes, mo, in C and E
        if mo has a sub BN then
            foreach n or nodes, sn, in n's subBN do
                Ask U whether add n or sn to mo's subBN;
                if U answer yes then
                    Add n or sn to the sub BN of mo;
                end
            end
        end
        if n has a sub BN then
            foreach mo or nodes, smo, in o's subBN do
                Ask U whether add mo or smo to n's subBN;
```

TABLE 2-continued

```
                if U answer yes then
                    Add mo or smo to the sub BN of n;
                end
            end
        end
        if mo is the node in C then
            Generate the link from mo to n;
        end
        if mo is the node in E then
            Generate links from n to mo;
        end
    end
```

In addition, upon constructing a Bayesian network, when the user requests information on other nodes, which may be connected with a specific Bayesian network node, the BN link generation unit 315 generates a list of candidate nodes, which can be connected with the specific Bayesian network node in a cause-and-effect relation, by making reference to a meta-model. Generating candidate nodes to be connected is individually performed with respect to each node, and is performed for all nodes in a main Bayesian network and sub-Bayesian networks. When the user selects a specific node from a list of collected candidate nodes, a link between two nodes is generated. In this case, the link is determined according to cause-and-effect relations specified in a meta-model. That is, a link from a node corresponding to a cause ontology class to a node corresponding to an effect ontology class is achieved.

In addition, when either a node whose link information is requested, or a candidate node selected by the user, exists in a main Bayesian network, and has a sub-Bayesian network, the BN link generation unit 315 requests the user terminal 100 to select whether or not a node in a counterpart main Bayesian network or nodes in a counterpart sub-Bayesian network are added to the sub-Bayesian network. When a plurality of nodes is selected by the user terminal 100, the BN link generation unit 315 adds the selected nodes to the sub-Bayesian network, thereby further expanding the sub-Bayesian network.

Returning to FIG. 1, the U-Health service provision server 300 includes a U-Health service provision section 320, which is requested to infer a disease and provides a result of an analysis of a disease by using a Bayesian network constructed as described above.

The U-Health service provision section 320 includes a U-Healthcare management unit 321, a web page management unit 322, a user information DB 327, and a web DB 328.

The U-Healthcare management unit 321 provides the user terminal 100 with a web page for provision of a U-Health service by using the web page managed by the web page management unit 322. Also, the U-Healthcare management unit 321 receives input personal information, including, for example, the user's age, sex, family disease history, and symptoms, according to a request of the user terminal 100, and infers a disease of the user by applying the input personal information to a Bayesian network constructed by the Bayesian network generation section 310. In one aspect of the invention, the inference of the disease is determined by performing a probabilistically analysis. In addition, the U-Healthcare management unit 321 sends a result of the analysis back to the user terminal 100, and stores the personal information and the result in the user information DB 327.

Meanwhile, the web page management unit 322 and the web DB 328 function to manage a web page for receiving information required for provision of the U-Health service from an exterior, and/or for outputting information generated by the server to the user terminal 100. The web page management unit 322 and the web DB 328 may be existing apparatuses implemented for web site management.

In addition, although the web page management unit 322 and the web DB 328 are illustrated, the present invention is not limited thereto, and the server 300 according to the present invention has only to include an apparatus capable of receiving/outputting data from/to the user terminal 100.

Figure 9:
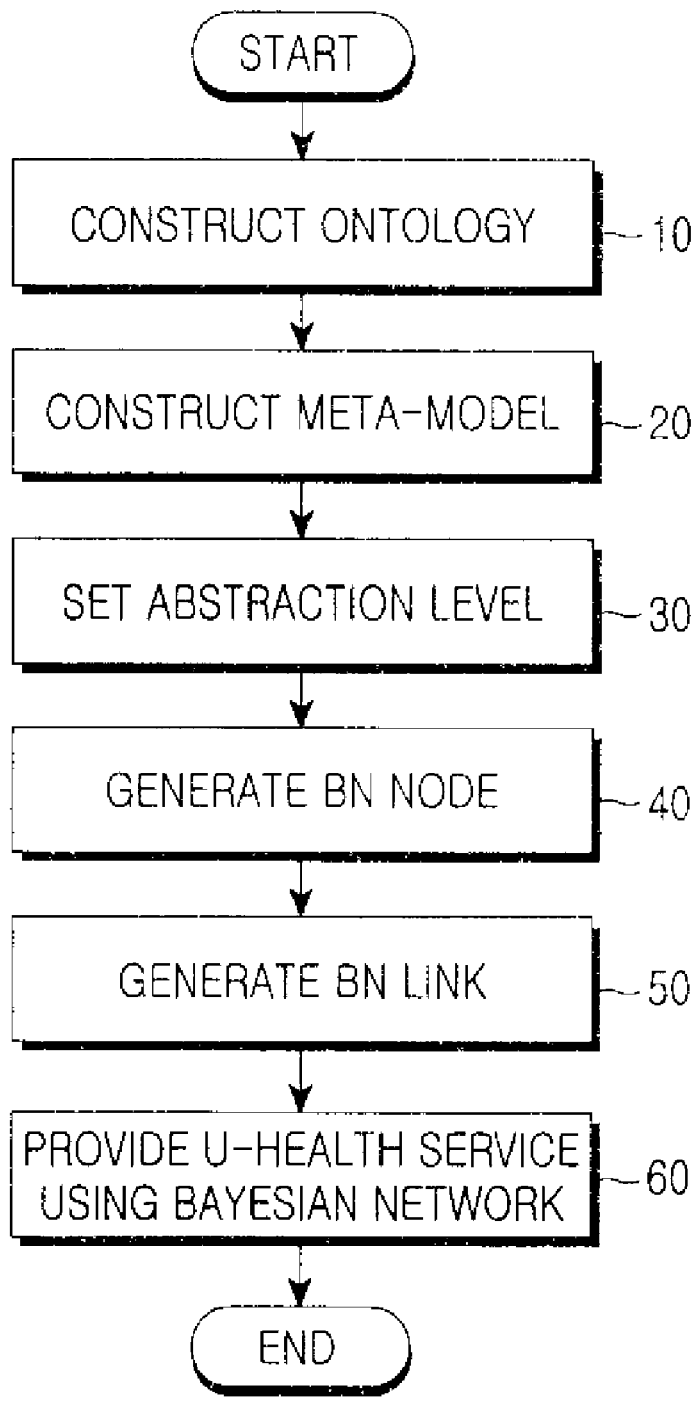
FIG. 9 is a flowchart illustrating the procedure of a U-Health service provision method using a Bayesian network according to an exemplary embodiment of the present invention.

A method for providing a U-Health service according to an exemplary embodiment of the present invention will be described by explaining the operation of the U-Health service provision system with reference to the aforementioned components and FIG. 9.

According to the U-Health service provision method, a specialized database required for service provision is first constructed. A procedure of constructing a database includes step 10 of constructing an ontology, step 20 of constructing a meta-model, and steps 30, 40, and 50 of generating a Bayesian network.

Step 10 may be performed through communication between the ontology management unit 311 and the user terminal 100. First, the ontology management unit 311 provides the user terminal 100 with an editing tool that is programmed to enable the user to edit an ontology. Then, while providing the user terminal 100 with a list of ontologies stored in the ontology DB 317, the ontology management unit 311 receives a selection of a specific ontology among the ontologies, and receives an input of a hierarchical structure between ontologies. For example, an ontology stored in the ontology DB 317 may have a structure as illustrated in FIG. 2. In addition, since the ontology DB 317 may store various ontologies that have no connection with a specific disease, a Bayesian network may be constructed with an unnecessarily complicated structure. Therefore, in step 10, it is preferred to further construct an intermediate ontology so as to lower the complexity of the Bayesian network structure, and to ensure consistency between the ontology and the Bayesian network.

Although the embodiment of the present invention has described a case where ontologies edited by the user are input from the user terminal 100 and are stored in step 10, the present invention is not limited thereto. For example, in step 10, the ontology management unit may access an external database that has stored Bio-information ontologies, receive an ontology required for service construction, and store the received ontology in the ontology DB 317.

Step 20 may be performed through communication between the meta-model management unit 312 and the user terminal 100. The meta-model management unit 312 provides the user terminal 100 with various elements relating to a disease, and receives information on cause-and-effect relationships between the elements.

Next, a procedure of generating a Bayesian network is performed. The procedure of generating a Bayesian network includes step 30 of setting an abstraction level, step 40 of generating Bayesian network nodes, and step 50 of forming links in the Bayesian networks.

Step 30 may be performed through communication between the abstraction level setting unit 313 and the user terminal 100. That is, the abstraction level setting unit 313 transfers a list of ontologies stored in the ontology DB 317, together with a hierarchical structure thereof, to the user terminal 100. In addition, the abstraction level setting unit 313 requests the user terminal 100 to select a specific layer from the hierarchical structure of ontologies. When a request signal for selection of a specific layer, together with the list of ontologies and the hierarchical structure thereof, is displayed on the user terminal 100, the user selects a layer among a plurality of layers displayed on the user terminal 100. The specific layer selected by the user is transferred to the abstraction level setting unit 313 in the server, and is stored.

Step 40 is performed by the BN node generation unit 314 when a selection signal of the specific layer selected in step 30 is received. When an ontology class does not have a subclass, the BN node generation unit 314 generates a Bayesian network node, which has a title of the corresponding ontology class, with True and False states. A Bayesian network node probabilistically represents whether or not a situation represented by an ontology class, which has been shifted into the corresponding Bayesian network node, exists. In addition, when an ontology class has subclasses, the BN node generation unit 314 generates a sub-Bayesian network. However, if the subclasses are expressed as having mutual disjointed relationships, and do not include parts which intersect in meaning, the BN node generation unit 314 does not generate a sub-Bayesian network. As a substitute, in this case, the BN node generation unit 314 adds the subclasses as states of nodes which are generated as a higher class.

When the user requests more detailed information on a node of the main Bayesian network, the BN node generation unit 314 may form a Bayesian network, activating a sub-Bayesian network corresponding to the node.

When Bayesian network nodes have been generated, step 50 forms links between the nodes is performed by the BN link generation unit 315. In step 50, the Bayesian network nodes are connected to each other in consideration of the cause-and-effect relations of a meta-model set in step 20.

Thereafter, at step 60 diagnosing a specific disease requested by the user is performed, through use of the U-Health ontology, the Bayesian network, the intermediate ontology, etc., generated in steps 10 to 50

Step 60 is performed by the U-Health service provision section 320. The U-Health service provision section 320 collects U-Health data required for U-Health service provision, for example, a user profile (e.g. name, age, sex, job, etc.), Bio-data (e.g. body weight, body fat, etc.) collected from sensors, and user information (e.g. family disease history, symptoms, etc.) obtained through history taking, by requesting the user terminal 100 to send the U-Health data. Then, the U-Health service provision section 320 expresses the collected data in connection with the U-Health ontology U-Health data expressed as an ontology is matched to the intermediate ontology, and is utilized as evidence upon inference using the Bayesian network. Through application of rules stored in the intermediate ontology to the U-Health data and through ontology inference, it is identified which class of an intermediate ontology can be inferred from currently given data. For example, when the caloric intake (e.g., 1600 kcal) and the caloric expenditure (e.g., 1300 kcal) of a user are given as U-Health data, the two pieces of data are matched to classes relating to caloric intake in the Bio-data ontology. The classes are utilized when rules applied to the intermediate ontology are performed. For example, by applying a rule that a difference between caloric intake and caloric expenditure exceeds 200 kcal, a class of "very high amount of surplus calorie" in the intermediate ontology is extracted. Classes on the intermediate ontology, which are inferred through ontology data and rules, are applied as evidence of the Bayesian network, and the Bayesian network updated with the evidence is finally utilized for Bayesian network inference. Probabilistic values, such as a possibility of having a corresponding disease or a complication, are inferred through the Bayesian network, and the values are extracted and processed to generate results of the diagnosis, such as a risk of complications, recommended treatment, the kind of a disease afflicting the user, etc. Then, the generated results are provided to the user through the user terminal 100.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, according to the present invention, a customized database for inference of a specific disease is constructed, so that it is possible to rapidly acquire reliable information.

While the present invention has been shown and described with reference to certain exemplary embodiments thereof it will be understood by those skilled in the art that various changes in form and details may be made therein without departing from the spirit and scope of the invention as defined by the appended claims.

What is claimed is:

1. A method, implemented in at least one processor, for constructing a database to deduce a disease, the method comprising:
   the at least one processor:
   analyzing U-Health information, which includes a disease, a symptom, and a treatment, and constructing a plurality of U-Health ontologies required for service provision;
   setting a meta-model defining cause-and-effect relationships between the constructed U-Health ontologies; and
   selecting a subset of the constructed U-Health ontologies comprising at least two specific U-Health ontologies from among the plurality of U-Health ontologies,
   setting the selected U-Health ontologies as nodes,
   generating a Bayesian network by applying the meta-model to the set nodes to thereby construct a customized database for inferring a disease of a user;
   whereby upon receiving personal information of the user, a disease of a user is inferred using a probabilistic analysis of said Bayesian network.

2. The method as claimed in claim 1, wherein said analyzing comprises:
   setting common ontologies which comprises various kinds of ontologies required for disease deduction; and
   setting an intermediate ontology, which comprises at least one specific ontology relating to a specific disease, from among the common ontologies.

3. The method as claimed in claim 1, wherein the U-Health ontologies comprise:
   a disease ontology in which information on kinds of disease is defined,
   a symptom ontology in which information on symptoms caused by diseases is defined,
   an environment ontology in which information on environments of a person targeted for disease deduction is defined, and
   a treatment ontology in which treatment methods for diseases are defined.

4. The method as claimed in claim 3, wherein the U-Health ontologies further comprises:
   user information ontology, including age, sex, family disease history, and biological signals.

5. The method as claimed in claim 3, wherein the U-Health ontologies further comprise:
   a sensor ontology including sensor information including kinds of sensors used for measuring biological signals of a user, and information on values measured by the sensors.

6. The method as claimed in claim 1, wherein the U-Health ontology corresponds to an ontology input from a user through an interface which enables the user to edit the ontology.

7. The method as claimed in claim 2, further comprising: constructing the intermediate ontology by:
   receiving personal information, including age, sex, family disease history, and symptoms,
   extracting specific classes corresponding to the personal information from among a plurality of classes included in the ontology, and
   combining the extracted classes.

8. The method as claimed in claim 1, wherein the meta-model corresponds to a model defining cause-and-effect relationships between a plurality of ontologies.

9. The method as claimed in claim 1, wherein said selecting a subset comprising at least two specific U-Health ontologies comprises:
   providing a user terminal with a hierarchical structure of the plurality of ontologies, and setting an abstraction level by receiving a selection of a level of a specific layer which relates to the U-Health service to be provided to a user;
   wherein said setting comprises setting an ontology included in at least one selected layer as a node of the Bayesian network by taking the set abstraction level into consideration; and
   said generating a Bayesian network comprises connecting nodes of the Bayesian network with each other by taking the meta-model into consideration.

10. The method as claimed in claim 9, wherein, in the step of setting the abstraction level, a layer and a highest layer level, in which an ontology of a disease having no connection with a specific disease for which a U-Health service is provided to diagnose among the plurality of ontologies is included, are restricted from being selected.

11. The method as claimed in claim 9, wherein the nodes of the Bayesian network comprise a main Bayesian network node constituted by an ontology which is included in a selected abstraction level's layer, and a sub-Bayesian network node constituted by an ontology which is included in a lower layer of the main Bayesian network node.

12. A method, implemented in at least one processor, for providing a U-Health service by using a Bayesian network, the method comprising the steps of:
   the at least one processor:
   analyzing U-Health information, which includes a disease, a symptom, and a treatment, and constructing a plurality of U-Health ontologies required for service provision;
   setting a meta-model defining cause-and-effect relationships between the constructed U-Health ontologies;
   selecting a subset of the constructed U-Health ontologies comprising at least two specific U-Health ontologies from among the plurality of U-Health ontologies, setting the selected U-Health ontologies as nodes, and generating a Bayesian network by applying the meta-model to the set nodes; and
   receiving personal information, which includes age, sex, family disease history, and symptoms, from a user, substituting the personal information into a customized database constructed based on the Bayesian network, and probabilistically inferring a disease of a user.

13. A system for providing a U-Health service, the system comprising:
   a user terminal; and
   a server connected with the user terminal through a communication network,
   wherein the server comprises:
      an ontology management unit for providing an interface to receive an ontology from the user terminal, and storing a plurality of ontologies received from a plurality of users in a database;
      a meta-model management unit for providing an interface to receive a meta-model defining cause-and-effect relationships between ontologies from the user terminal, and storing the received meta-model in a database;

an abstraction level setting unit for providing the user terminal with a hierarchical structure of a plurality of ontologies, receiving a user selection of a level of a specific layer relating to a U-Health service to be provided to a user, and setting an abstraction level;

a Bayesian-network node generation unit for setting an ontology included in at least one selected layer as a node of a Bayesian network by taking the set abstraction level into consideration;

a Bayesian-network link generation unit for connecting nodes of the Bayesian network with each other by taking the meta-model into consideration whereby the Bayesian network is generated as a customized database on the basis of the user selection;

a U-Healthcare management unit for receiving personal information, which includes a user's age, sex, family disease history, and symptoms, from the user terminal, substituting the personal information into a database constructed based on the Bayesian network, and probabilistically inferring a disease of a user and a result of a diagnosis; and a web page management unit for providing an input/output interface with the user terminal through a web page, and providing the user terminal with a result of the inference by the U-Healthcare management unit.

14. Apparatus for constructing a database to deduce a disease and constructing a Bayesian network for U-Health application, comprising:

a memory including code which when accessed by a processor causes the processor to execute the steps of:

analyzing U-Health information, which includes a disease, a symptom, and a treatment, and constructing a plurality of U-Health ontologies required for service provision;

setting a meta-model defining cause-and-effect relationships between the constructed U-Health ontologies; and selecting a subset of the constructed U-Health ontologies comprising at least two specific U-Health ontologies from among the plurality of U-Health ontologies, setting the selected U-Health ontologies as nodes, generating a Bayesian network by applying the meta-model to the set nodes to thereby construct a customized database for inferring a disease of a user;

whereby upon receiving personal information of the user, a disease of the user is inferred using a probabilistic analysis of said Bayesian network.

15. The apparatus as claimed in claim 14, wherein step of analyzing comprises the steps of:

setting common ontologies which comprises various kinds of ontologies required for disease deduction; and setting an intermediate ontology, which comprises at least one specific ontology relating to a specific disease, from among the common ontologies.

16. The apparatus as claimed in claim 14, wherein the U-Health ontologies comprise:

a disease ontology in which information on kinds of disease is defined, a symptom ontology in which information on symptoms caused by diseases is defined, an environment ontology in which information on environments of a person targeted for disease deduction is defined, and a treatment ontology in which treatment methods for diseases are defined.

17. The apparatus as claimed in claim 16, wherein the U-Health ontologies further comprises:

user information ontology, including age, sex, family disease history, and biological signals.

18. The apparatus as claimed in claim 16, wherein the U-Health ontologies further comprise:

a sensor ontology including sensor information including kinds of sensors used for measuring biological signals of a user, and information on values measured by the sensors.

19. The apparatus as claimed in claim 14, wherein the U-Health ontology corresponds to an ontology input from a user through an interface which enables the user to edit the ontology.

20. The apparatus as claimed in claim 15, wherein said processor constructs the intermediate ontology by executing the steps of:

receiving personal information, including age, sex, family disease history, and symptoms, extracting specific classes corresponding to the personal information from among a plurality of classes included in the ontology, and combining the extracted classes.

21. The apparatus as claimed in claim 14, wherein the meta-model corresponds to a model defining cause-and-effect relationships between a plurality of ontologies.

22. The apparatus as claimed in claim 14, wherein the step of selecting at least two specific U-Health ontologies comprises the steps of:

providing a user terminal with a hierarchical structure of the plurality of ontologies, and setting an abstraction level by receiving a selection of a level of a specific layer which relates to the U-Health service to be provided to a user;

setting an ontology included in at least one selected layer as a node of the Bayesian network by taking the set abstraction level into consideration; and connecting nodes of the Bayesian network with each other by taking the meta-model into consideration.

23. The apparatus as claimed in claim 22, wherein, in the step of setting the abstraction level, a layer and a highest layer level, in which an ontology of a disease having no connection with a specific disease for which a U-Health service is provided to diagnose, among the plurality of ontologies included, are restricted from being selected.

24. The apparatus as claimed in claim 22, wherein the nodes of the Bayesian network comprise a main Bayesian network node constituted by an ontology which is included in a selected abstraction level's layer, and a sub-Bayesian network node constituted by an ontology which is included in a lower layer of the main Bayesian network node.

* * * * *